(12) United States Patent
Saito et al.

(10) Patent No.: US 11,861,779 B2
(45) Date of Patent: Jan. 2, 2024

(54) DIGITAL OBJECT ANIMATION USING CONTROL POINTS

(71) Applicant: Adobe Inc., San Jose, CA (US)

(72) Inventors: Jun Saito, Seattle, WA (US); Jimei Yang, Mountain View, CA (US); Duygu Ceylan Aksit, London (GB)

(73) Assignee: Adobe Inc., San Jose, CA (US)

( * ) Notice: Subject to any disclaimer, the term of this patent is extended or adjusted under 35 U.S.C. 154(b) by 16 days.

(21) Appl. No.: 17/550,432

(22) Filed: Dec. 14, 2021

(65) Prior Publication Data

US 2023/0186544 A1 Jun. 15, 2023

(51) Int. Cl.
*G06F 3/01* (2006.01)
*G06T 13/80* (2011.01)
*G06T 7/33* (2017.01)

(52) U.S. Cl.
CPC .............. *G06T 13/80* (2013.01); *G06F 3/012* (2013.01); *G06F 3/017* (2013.01); *G06T 7/33* (2017.01)

(58) Field of Classification Search
None
See application file for complete search history.

(56) References Cited

U.S. PATENT DOCUMENTS

| | | | |
|---|---|---|---|
| 8,660,306 B2* | 2/2014 | Tu | G06V 40/107 348/169 |
| 9,001,132 B1* | 4/2015 | Wooley | G09G 5/00 345/474 |
| 11,055,891 B1* | 7/2021 | Ofek | G06T 13/40 |
| 2008/0024503 A1* | 1/2008 | Smith | G06T 13/40 345/473 |
| 2014/0334670 A1* | 11/2014 | Guigues | G06V 40/23 382/103 |
| 2017/0206695 A1* | 7/2017 | Kim | G06T 19/20 |
| 2017/0294041 A1* | 10/2017 | Kaufman | G06F 3/04845 |
| 2021/0209788 A1* | 7/2021 | Kim | G06T 7/73 |
| 2022/0130115 A1* | 4/2022 | Assouline | G06T 7/70 |

(Continued)

OTHER PUBLICATIONS

Bernardin et al., 'Normalized Euclidean Distance Matrices for Human Motion Retargeting', MiG'17. (Year: 2017).*

(Continued)

*Primary Examiner* — Patrick F Valdez
(74) *Attorney, Agent, or Firm* — FIG. 1 Patents

(57) ABSTRACT

Digital object animation techniques are described. In a first example, translation-based animation of the digital object operates using control points of the digital object. In another example, the animation system is configured to minimize an amount of feature positions that are used to generate the animation. In a further example, an input pose is normalized through use of a global scale factor to address changes in a z-position of a subject in different digital images. Yet further, a body tracking module is used to computing initial feature positions. The initial feature positions are then used to initialize a face tracker module to generate feature positions of the face. The animation system also supports a plurality of modes used to generate the digital object, techniques to define a base of the digital object, and a friction term limiting movement of features positions based on contact with a ground plane.

20 Claims, 17 Drawing Sheets

(56) References Cited

U.S. PATENT DOCUMENTS

2022/0305640 A1* 9/2022 Yamamoto ............. B25J 9/0045

OTHER PUBLICATIONS

"Notch 0.9.23.195 NVIDIA patch release walk-through", YouTube Video uploaded by Notch [online][retrieved Oct. 12, 2021]. Retrieved from the Internet <https://www.youtube.com/watch?v=pJEunuv2noo>., Apr. 12, 2021, 4 Pages.

"Real-Time Body Tracking Capture and reconstruct 3D full body motion", DeepMotion Inc. [retrieved Oct. 12, 2021]. Retrieved from the Internet <https://www.deepmotion.com/3d-body-tracking>., 2014, 4 Pages.

* cited by examiner

DIGITAL OBJECT ANIMATION USING CONTROL POINTS

BACKGROUND

Animation of digital objects is found in an ever-increasing range of usage scenarios. In one example, animation of the digital object is based on movement of a subject detected in digital images, e.g., a human being as part of a digital video. Detected movement is used to generate an animation to cause corresponding movement of an avatar, puppet, or other digital object to form the animation. The animations are configured for output in real time, saved for online access via social medial platforms, and so on.

Conventional techniques used to generate animations based on a subject captured in a digital image, however, face numerous technical challenges that cause introduction of visual artifacts and inaccuracies in the animation. These inaccuracies, for instance, cause distortions in portions of the digital object (e.g., to incorporate an irregular bend in an arm), cause the digital object to "float" over the ground, and so forth. Consequently, conventional techniques often fail for their intended purpose by producing results that lack realism and result in inefficient use of computational resources to remedy these defects.

SUMMARY

Digital object animation techniques are described that overcome conventional technical challenges to improve accuracy and efficiency in computational resource consumption. In a first example, translation-based animation of the digital object operates using control points (e.g., warp handles) of the digital object. In a second example, the animation system is configured to minimize an amount of feature positions that are used to generate the animation. In a third example, an input pose is normalized through use of a global scale factor to address changes in a z-position of a subject in different digital images. In a fourth example, a body tracker module is used to compute initial feature positions. The initial feature positions are then used to initialize a face tracker module to generate feature positions of the face.

In a fifth example, the animation system also supports a plurality of modes used to generate the digital object, e.g., to define different hierarchical processing orders based on which features are visible in a subject of the animation. In a sixth example, the animation system employs techniques in which vertical offsets of a base of the digital object (e.g., feet) are defined directly from positional offsets scaled by a global scale factor as described above. The animation system is also configured to employ techniques that employ a friction term limiting movement of features positions based on contact with a ground plane and constrains these positions to occur above the ground plane. This promotes realism and reduces artifacts such as "foot skating" caused by conventional techniques.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
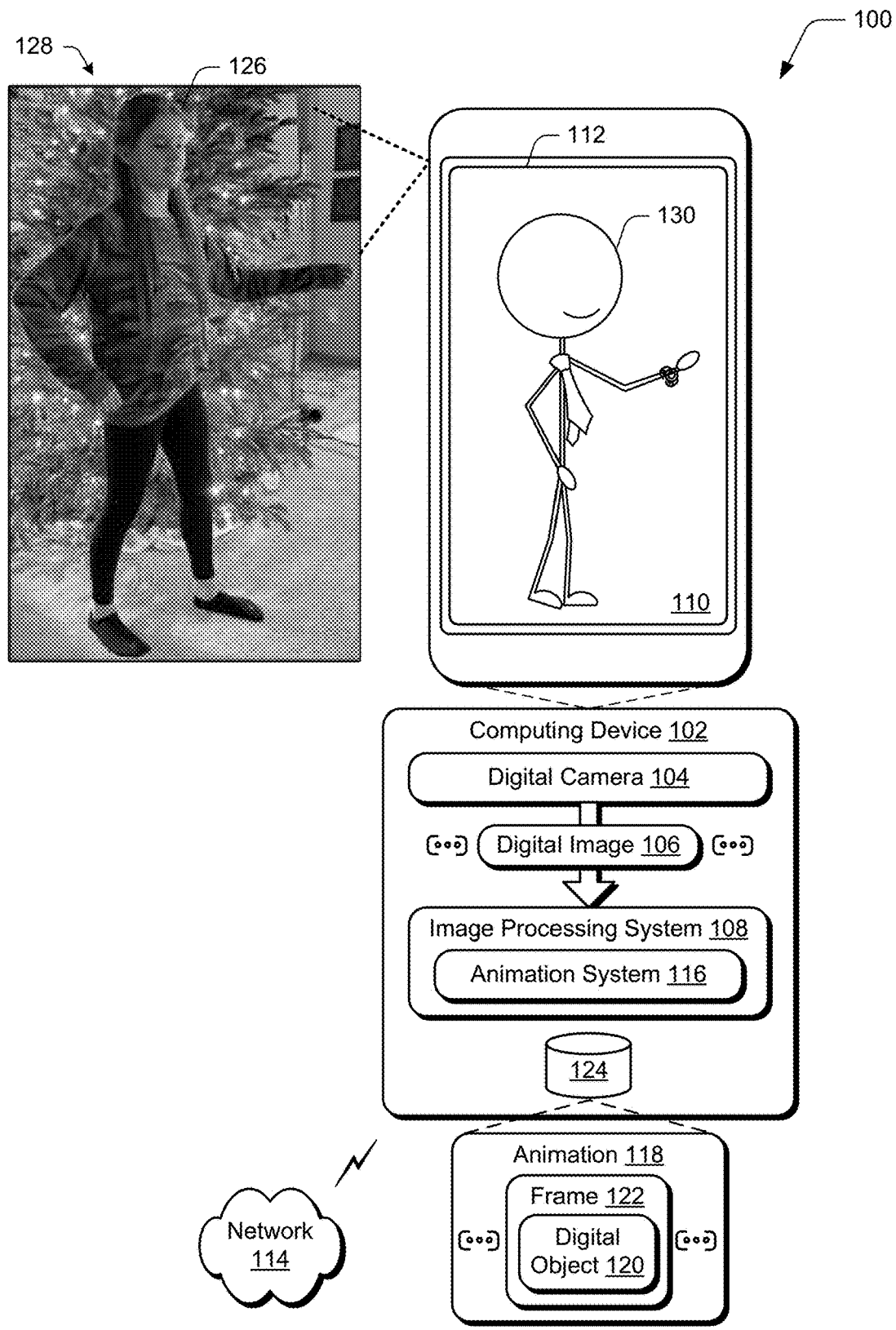
FIG. 1 is an illustration of an environment in an example implementation that is operable to employ digital object animation techniques described herein.

Animations that depict movement of a digital object that mimics movement of a subject captured from digital images are found in social media platforms, prime-time television programs, and so on. In one example, a digital camera is used to capture digital images of a user, e.g., as part of a digital video stream. Motion tracking is then used to generate frames of an animation that exhibit movement that follows the user's movement captured in the digital images.

Conventional techniques to do so, however, face numerous technical challenges. In one conventional example, movement of the digital object is achieved by rotations to "bones" specified for corresponding portions of the digital object. However, in some instances this causes visual artifacts, e.g., in order to address changes in a z-axis in a two-dimensional digital object that result in unnatural bends to portions of the object. In another example, the digital object appears to float over a surface over time as errors in generating the digital object accumulate over time, thereby giving an unnatural appearance that is often hidden in practice by avoiding display of lower portions of the object.

Accordingly, digital object animation techniques are described that overcome these technical challenges to improve accuracy and efficiency in computational resource consumption. In a first example, translation-based animation of the digital object operates using control points (e.g., warp handles) of the digital object. Calibration data is generated that defines positional offsets of the control points of a digital object with respect to feature positions of a subject captured in a calibration digital image. This is used to define a baseline that indicates correspondence between features (e.g., eyes, shoulders, elbow, hands, etc.) and scaling of these features of the subject with respect to control points of the digital object. Frames of the animation are then generated by scaling the positional offsets based on changes to the feature positions captured in subsequent digital images. In this way, the techniques described herein overcome the challenges and inaccuracies caused by conventional use of rotation-based techniques that introduce errors and are resource intensive, thus improving operation of computing devices that implement these techniques.

Additional functionality is also implemented by the techniques and systems described herein to improve digital object animation generation. The animation system, for instance, is configured to minimize an amount of feature positions that are used to generate the animation. This supports generation of animations for a "close in" subject (e.g., when sitting at a desk) in which an entirety of the subject is not visible by estimating proportions and scaling positional offsets for features that are not visible based on the features that are, e.g., by sequentially progressing through a control point hierarchy.

In a third example, an input pose is normalized through use of a global scale factor to address changes in a z-position of a subject in different digital images. This is performed, for instance, by detecting a scale of features positions included as part of a face or shoulders of the subject, which is then compared with positional offsets of control points from the calibration data that correspond to these feature positions to generate a global scale factor. This global scale factor is thus usable to "factor out" distance from the digital camera to improve consistency in animation of the digital object and reduce artifacts.

In the above example, the global scale factor is based on detection of feature positions in a face of the subject. Because of this, accuracy of this detection has a direct effect on overall accuracy in the generation of the animation as a whole. In order to improve this accuracy, a body tracking module is used to compute initial feature positions. The initial feature positions are then used to initialize a face tracker module to generate feature positions of the face. This improves accuracy and overcomes issues encountered in real-world scenarios in which face tracking accuracy departs from the subject as captured by the digital images, e.g., due to background textures, inclusion of faces on other articles such as depicted on a T-shirt of the subject, and so forth.

Digital object animation is employed in a wide range of scenarios, including scenarios involving different positioning of the subject in relation to a digital camera, e.g., distance from the digital camera. Changes in this distance cause differences in scale between the features as described above as well as differences in features visibility that serve as a basis to form the animation of the digital object in successive frames.

In order to address these different scenarios, the animation system supports a plurality of modes used to generate changes to the digital object. A full-body mode, for instance, is usable by the animation system when portions of a full-body of the subject are visible. This causes the animation system to scale the positional offsets in a hierarchy starting at a middle of the digital object and proceeding outward, e.g., from the waist and processing outward to the head and the feet of the digital object. This minimizes accumulation of error in animation of the digital object as opposed to conventional techniques that are limited to a top/down approach that causes "float" as error accumulates over time. On the other hand, when a middle of the subject is not visible, an upper body mode is employed in which the positional offsets are scaled in a hierarchy beginning at a top (e.g., head) of the digital object and progressing downward. In this way, the animation system adapts to differences in visibility of the subject to improve accuracy in generation of the animation of the digital object and overcome inaccuracies encountered in conventional techniques.

As also described above, conventional techniques are challenged with inaccuracies that cause an animation of a digital object to "float" over a surface over time. This is caused, typically, by error accumulation over time and use of a top/down hierarchy. Accordingly, the animation system employs techniques in which vertical offsets of a base of the digital object (e.g., feet) are defined directly from positional offsets scaled by a global scale factor as described above. The animation system is also configured to employ techniques using a friction term that limits movement of features positions based on contact with a ground plane and constrains these positions to occur above the ground plane. This promotes realism and reduces artifacts such as "foot skating" caused by conventional techniques. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ digital object techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 14.

The computing device 102 is illustrated as including a digital camera 104 that is configured to capture a digital image 106. The digital camera 104, for instance, includes a charge-coupled device (CCD) as a sensor that is configured to generate the digital image 106 as a collection of pixels. The digital image 106 is illustrated as being communicated to an image processing system 108. The image processing system 108 is implemented at least partially in hardware of the computing device 102 to process and transform the digital image 106. Such processing includes creation of the digital image 106, modification of the digital image 106, and rendering of the digital image 106 in a user interface 110 for output, e.g., by a display device 112. Although illustrated as implemented locally at the computing device 102, functionality of the image processing system 108 is also configurable as whole or part via functionality available via the network 114, such as part of a web service or "in the cloud."

An example of functionality incorporated by the image processing system 108 to process the digital image 106 is illustrated as an animation system 116. The animation system 116 is representative of functionality to generate an animation 118 by processing the digital image 106 to configure digital objects 120 for respective frames 122 of the animation, which is illustrated as stored in a storage device 124.

The digital camera 104, for instance, captures a digital image 106 of a subject 126 in a physical environment 128, e.g., the "real world." From this, the animation system 116 configures a digital object 120 based on the subject 126, e.g., to configure corresponding portions of a body to mimic a pose of the subject 126. This is performed by retargeting control points the digital object 120 to form a retargeted digital object 140 based on correspondence with feature positions of the subject 126. Feature positions of the subject 126 (e.g., a chin, shoulders, elbows, corners of the mouth, and so on), for instance, are mapped to corresponding control points of the digital object 120.

Changes to positions of these features (i.e., feature positions) over successive digital images 106 are then used to retarget the control points of the digital object 120 (e.g., through translation) to generate respective frames 122 of the animation 118. Although humanoid subjects 126 and digital objects 120 that are generally humanoid are described in the following discussion, subjects 126 and digital objects 120 are each configurable as a variety of non-humanoid objects, e.g., a beach ball, automobile, dog, and so forth. Further discussion of these and other examples is included in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Digital Object Animation

The following discussion describes digital object animation techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-12. During the discussion, reference is also made in parallel to an example procedure 500 of FIG. 5.

Figure 2:
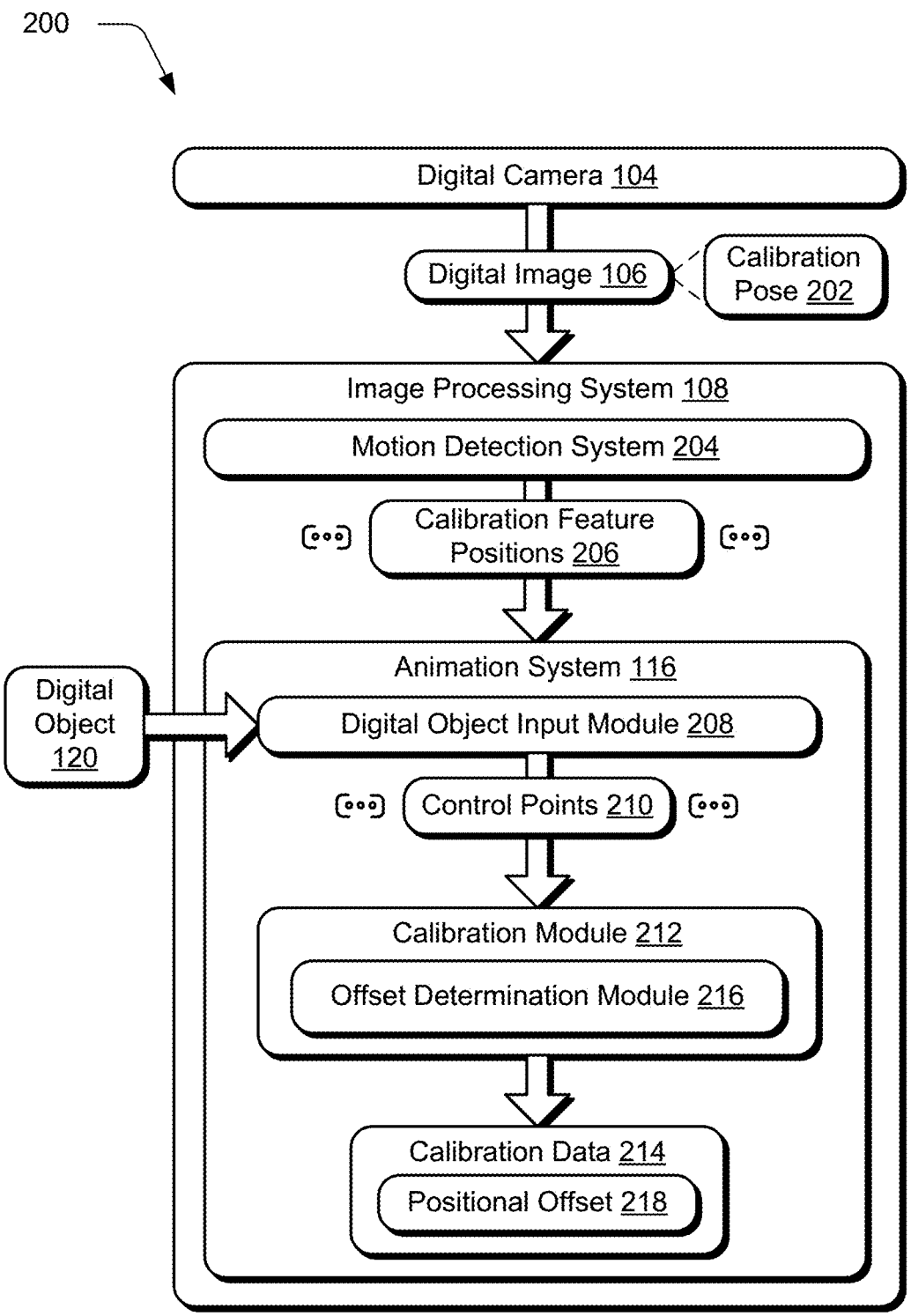
FIG. 2 depicts a system in an example implementation showing operation of an image processing system of FIG. 1 in greater detail.

FIG. 2 depicts a system 200 in an example implementation showing operation of the animation system 116 in greater detail as generating calibration data (block 502). This example begins by capturing a digital image 106 of a calibration pose 202 of a subject 126 using a digital camera 104. The calibration pose 202 is specified as having a sufficient number of features of the subject 126 viewable to infer an overall structure of the subject 126 as well as positional offsets between the features of the subject 126 and control points of the digital object 120. The calibration pose 202, for instance, may include a threshold number of features that are usable to infer other features and distances of these features with respect to each other that are not currently viewable in the digital image 106.

Figure 3:
FIG. 3 is an illustration of an example calibration pose.
Figure 3:
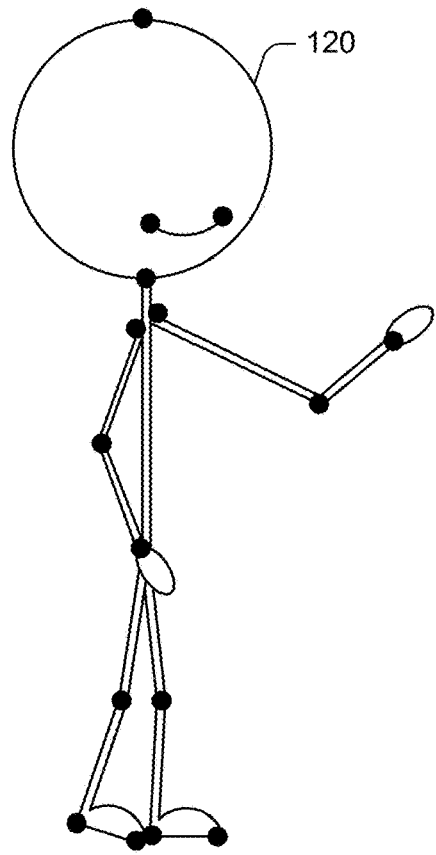
Figure 3:
Figure 3:
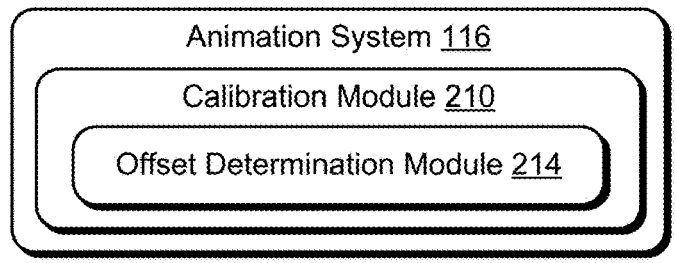

As shown in an example 300 of FIG. 3, a digital object 120 is illustrated in which control points are represented using black circles. The control points correspond to joints and facial features of the digital object that are moveable to mimic movement detected in the subject. The warp handles, for instance are included within a mesh such that changes to a location of the warp handles cause a corresponding change to vertices of the mesh. Therefore, by generation of positional offsets based on the calibration feature positions 206 is usable to translate the control points 210 to cause the digital object 120 to mimic the subject, and more particularly a calibration pose 202 of the subject.

The digital image 106, for instance, is provided as an input to a motion detection system 204 of the image processing system 108. The motion detection system 204 is configured to identify features and positions of the features for use in calibration, which is represented as calibration feature positions 206 in FIG. 2. Features of the subject 126 include features of a body, such as joints (e.g., elbow, knee), bottoms of feet, top of head, and so forth. The body feature positions are usable to construct a skeleton that joins these features together. The calibration feature positions 206 also include facial features, such as corners of the mouth, eyes, tip of nose, ears, chine, and so on.

The calibration feature positions 206 are then provided as an output to the animation system 116. The animation system 116 includes a digital object input module 208 that is configured to obtain a digital object 120 (e.g., from a storage device 124) and from this identify control points 210 included in the digital object 120. The control points 210 are usable to define an overall shape, position, and scale of parts of the digital object 120. In one example, the identified control points 210 are configured as warp handles of a mesh and the digital object 120 is configured as a puppet. Warp handles are moveable to manipulate the shape of the digital object 120. Movement of the warp handles is used, for instance, as a basis to warp an underlying mesh of the digital object 120. This is usable to warp particular portions of the digital object 120, the digital object 120 as a whole, and so forth. Identification of the control points 210 includes examining data for predefined control points 210 included as part of the digital object 120, output of the digital object 120 in the user interface 110 for manual specification via user inputs, and so forth.

A calibration module 212 is then employed to generate calibration data 214 based on the control points 210 and calibration feature positions 206. To do so, an offset determination module 216 is utilized to generate positional offsets 218 for the identified control points 210 based on the calibration feature positions 206 of the calibration pose 202. This operates as a mapping between the identified control points 210 of the digital object 120 to be animated and the calibration feature positions 206 of the subject 126 as positional offsets. In this way, subsequent movement of the subject 126 in subsequent digital images is transferred to the digital object 120 by retargeting the control points 210 by scaling the positional offsets 218, further discussion of which is included below.

Figure 4:
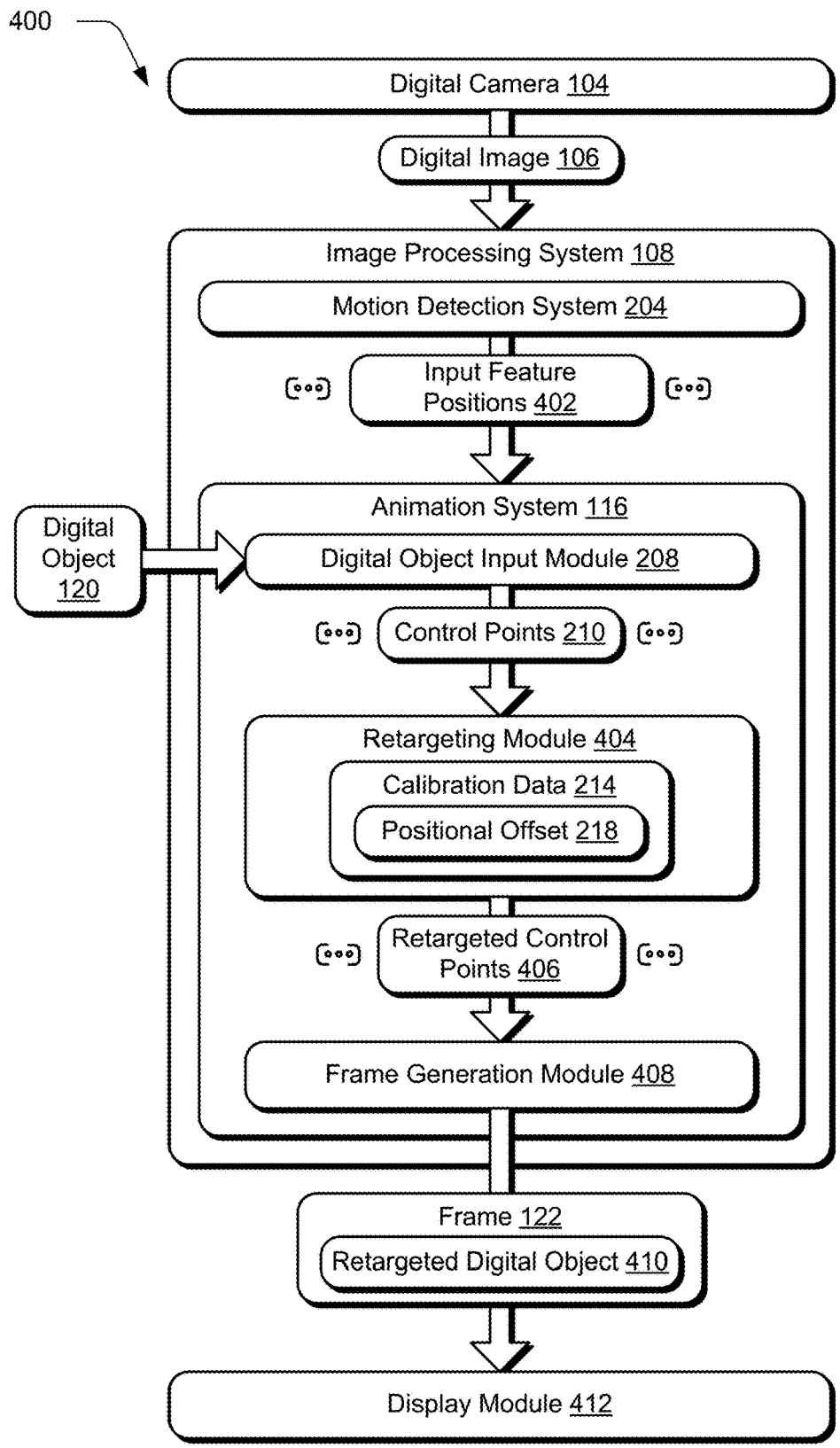
FIG. 4 depicts a system in an example implementation of generation of calibration data.
Figure 5:
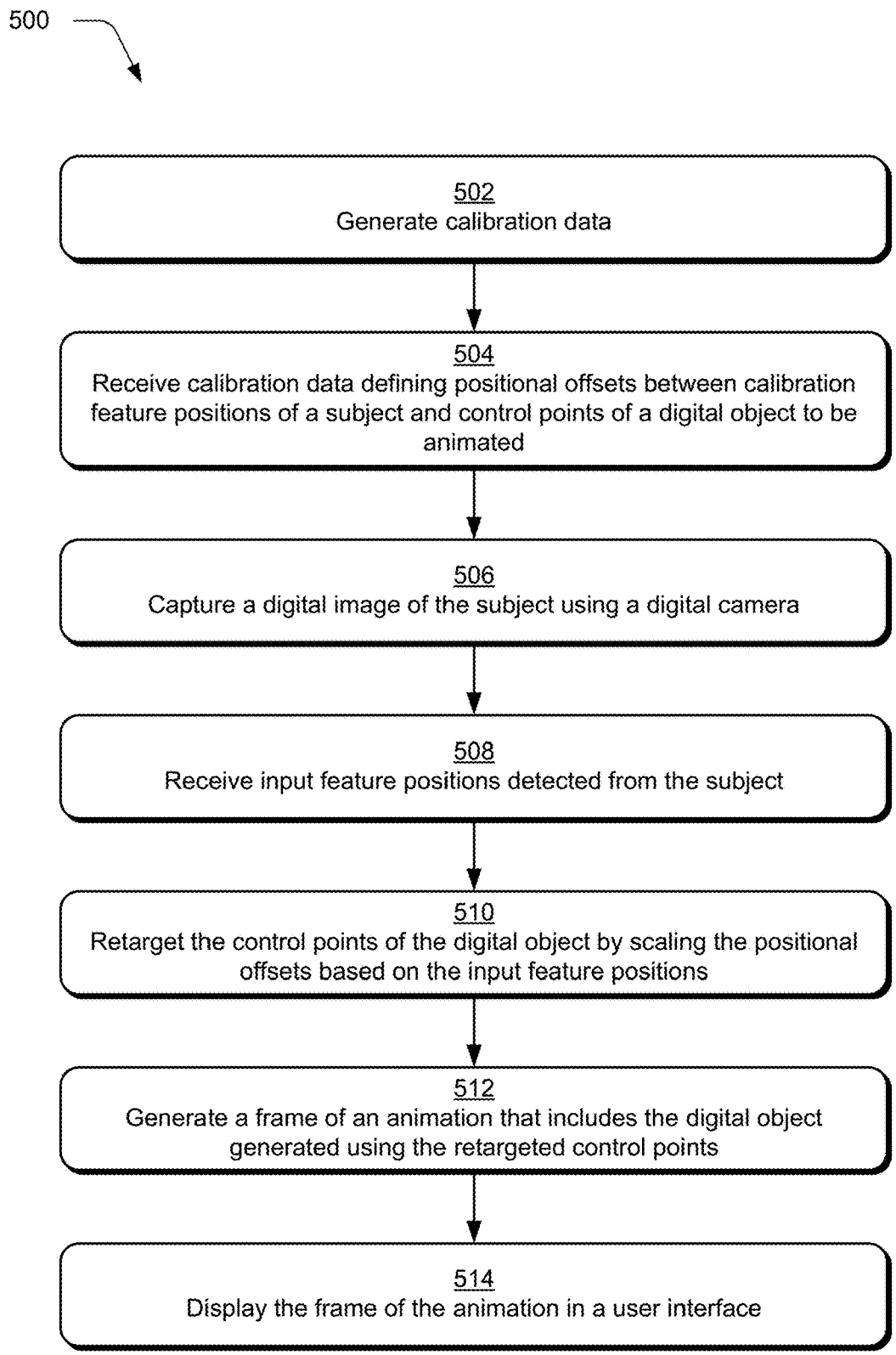
FIG. 5 is a flow diagram depicting a procedure in an example implementation of digital object animation.

FIG. 4 depicts a system 400 in an example implementation showing operation of the animation system 116 in greater detail as generating a frame 122 of an animation 118 based on a subject 126 captured in a digital image 106. This example continues by receiving calibration data 214 defining positional offsets 218 between calibration feature positions 206 of a subject and control points 210 of a digital object 120 to be animated (block 504).

A digital camera 104 is used to capture a digital image 106 of a subject 126 (block 506), e.g., subsequent to the capture of the digital image 106 used for the calibration techniques described above. The motion detection system 204 is employed to generate input feature positions 402 detected from the subject 126 captured in the digital image 106, which are then received by the animation system 116 (block 508). The motion detection system 204, for instance, is configured to differentiate the subject 126 from a background of the digital image 106, and then identify features from the subject 126. This includes body features as described above such as joint, shoulders, knees, elbows, hands, ankles, head, and so on. This also includes facial features such as a corner of a mouth, tip of nose, eyebrows, chin, jawline, and so forth. The input feature positions 402 thus represent both the features and identifies a position of the features, e.g., in two-dimensional or three-dimensional space.

The digital object input module 208 is also utilized to obtain control points 210 (e.g., to identify warp handles) from the digital object 120 as described above. The control points 210 and input feature positions 402 are then passed as inputs to a retargeting module 404. The retargeting module 404 is configured to retarget the control points 210 to generate retargeted control points 406 by scaling the positional offsets 218 of the calibration data 214 based on the input feature positions 402 (block 510).

The control points 406, for instance, are configurable as warp handles associated with an underlying mesh. Movement of the warp handles thus causes a corresponding warp to the mesh, e.g., as continuing across vertices of the mesh until another control point is reached. Therefore, in this example the retargeting module 404 is configured to generate the retargeted control points 406 by scaling the positional offsets 218 for the control points 210 based on respective input feature positions 402. The approach supports an ability to "hallucinate" three-dimensional movement and is robust to various digital object styles having extreme body proportions, which is not possible in conventional techniques.

Figure 6:
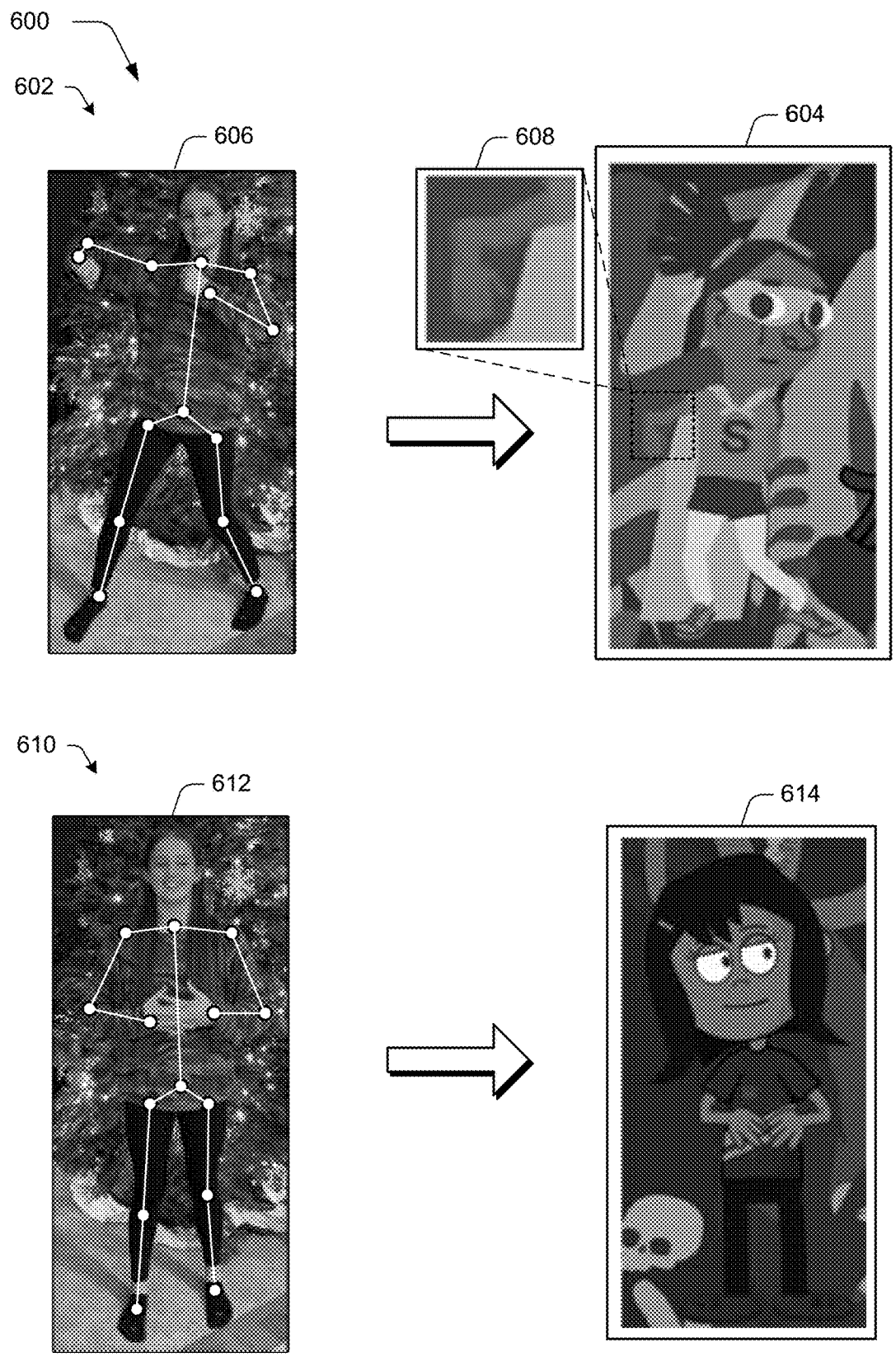
FIG. 6 depicts an example contrasting an error in a rotation-based technique with a translation-based technique.

As shown in an example implementation 600 of FIG. 6, a first usage scenario 602 is depicted of an input digital image 604 and a frame 606 of an animation generated using a conventional technique. The first usage scenario 602 is an example of a rotation-based approach. As previously described, rotation-based approaches rely on "bones" that are joined together to form a skeleton, which are then rotated. However, this rotation may cause visual artifacts as shown in an expanded view 608, e.g., when feature positions are located close together in order to give an appearance of depth in a two-dimensional digital image. In the illustrated example, a forearm of the digital object includes an unnatural bend resulting from the rotation of a forearm toward the digital camera 104.

In a second usage scenario 610 in which the described translation and scaling based retargeting techniques are employed, these artifacts are avoided. Forearms pointed towards a digital camera 104 in a subject captured by a digital image 612, for instance, result in a frame 614 of an animation having a natural appearance that support an appearance of depth of respective portions of the digital object 120 in relation to each other. In this way, the techniques described herein overcome the technical challenges of conventional techniques to avoid inclusion of visual artifacts and support a realistic appearance.

Returning again to FIG. 4, the retargeted control points 406 are received as an input by a frame generation module 408 to generate a frame 122 of the animation 118 that includes a retargeted digital object 410 (block 512). As previously described, the control points 210 are used to control an underlying structure (e.g., mesh) of the digital object 120. Therefore, changes to locations of the control points 210 as retargeted control points 406 when implemented as warp handles causes generation of a retargeted digital object 410 having a configuration (e.g., pose) that mimics the configuration of the subject 126 as captured in the digital image 106. The frame 122 of the animation 118 is then displayed in a user interface 110 (block 514) by a display module 412 in the illustrated example. In this way, the animation system 116 overcomes conventional challenges to improve accuracy in generation of the animation 118 and computational resource utilization.

Figure 7:
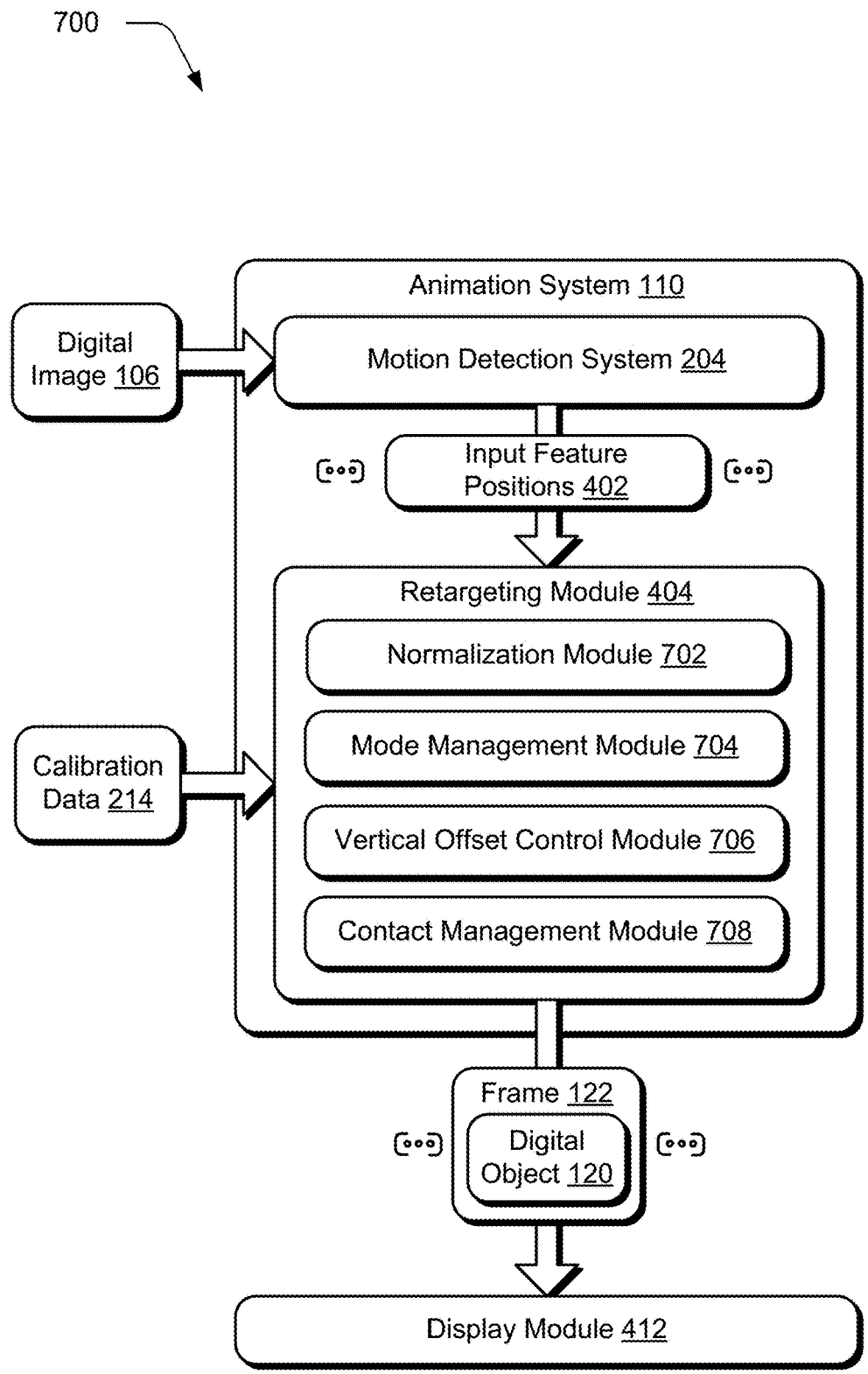
FIG. 7 depicts a system in an example implementation showing operation of a retargeting module of FIG. 4 in greater detail.

FIG. 7 depicts an example 700 of additional functionality incorporated as part of the retargeting module 404. The above example described a scenario involving configuration of a digital object 120 using scale and translation. Additional functionality is also incorporated as part of the retargeting module 404 to overcome conventional technical challenges. Examples of this functionality are represented as a normalization module 702, a mode management module 704, a vertical offset control module 706, and a contact management module 708. Functionality of each of these features is described in relation to corresponding figures in the following discussion.

Figure 8:
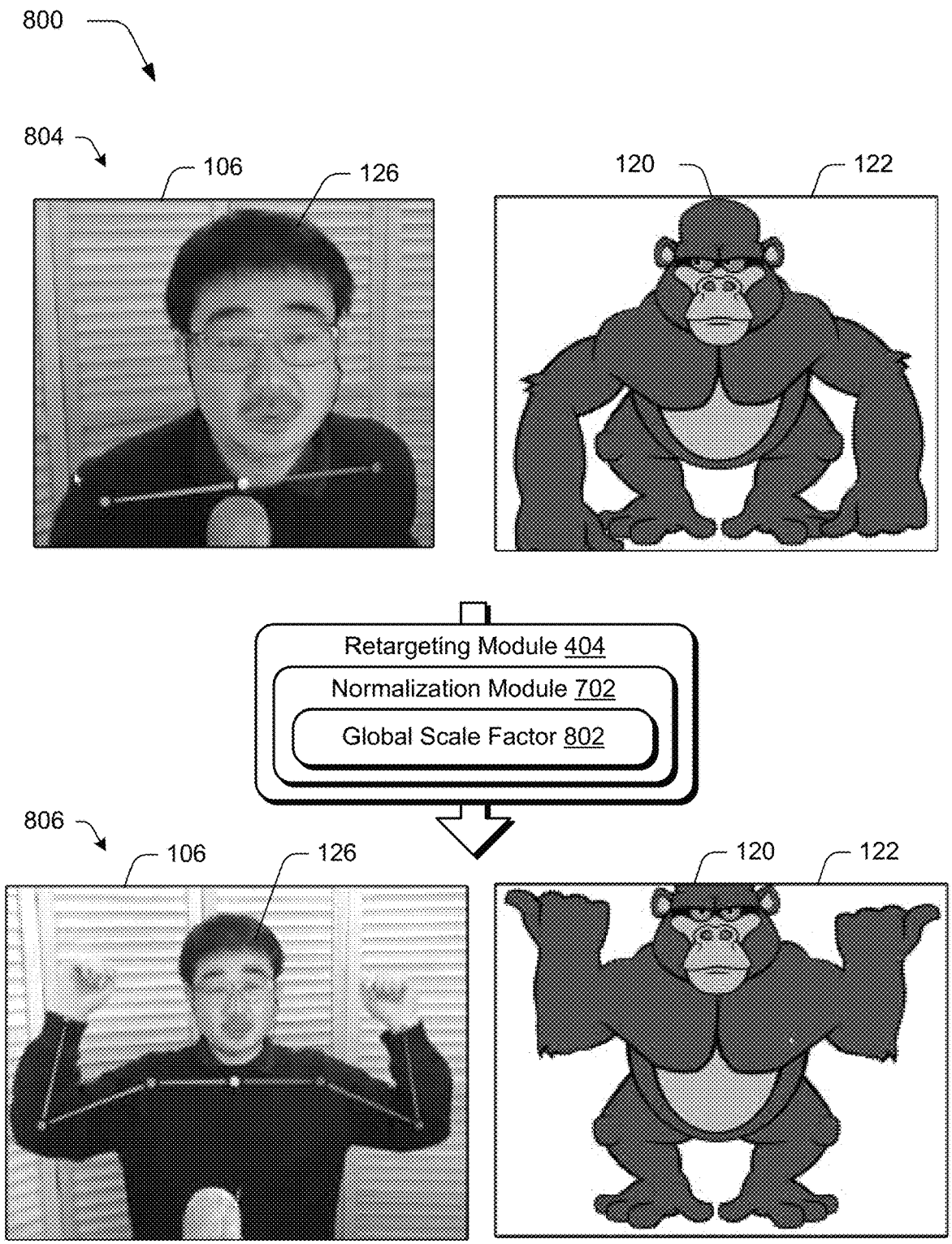
FIG. 8 depicts an example of operation of a normalization module of the retargeting module in greater detail.

FIG. 8 depicts an example 800 showing operation of the normalization module 702 of FIG. 7 in greater detail. In some usage scenarios, animation of the digital object 120 is performed to be invariant to a distance, at which, a subject is positioned from a digital camera 104. In order to do this, the normalization module 702 computes a global scale factor 802 for digital images as received from the digital camera 104. This is illustrated in FIG. 8 through use of first and second stages 804, 806.

As the first stage 804, feature positions illustrated as dots and lines that track a subject's 126 shoulders and face when positioned close to digital camera 104. This results in generation of the digital object 120 to appear at a set distance in the frame 122 of the animation. At the second stage 806, the subject 126 is positioned further away from the digital camera 104 such that feature positions corresponding to the shoulder, face, and arms are visible. The digital object 120 is generated to mimic this pose at the same set distance in the frame 122 as in the first stage 804.

To achieve this, the global scale factor 802 is calculated to "factor out" changes in depth by detecting a scale between feature positions that typically have a set distance, e.g., eyes, shoulders, edges of a head, etc. In this way, the digital object 120 appears at a same depth regardless of movement of the subject along a z-axis. In the illustrated example, a global scale factor is computed between the shoulders of the subject 126 in the digital image 106 in the first stage 804 that is used to address when the subject 126 is positioned close to the digital camera 104. Likewise, another global scale factor is computed between the shoulders of the subject in the digital image 106 at the second stage 806 to "factor out" the change of the subject 126 as positioned further away from the digital camera 104. In an implementation, an option is configured as selectable via the user interface 110 (e.g., a button) to turn this functionality "off" or "on," e.g., to enable changes in a z-axis defined in relation to the digital camera 104 by not employing the global scale factor 802.

Figure 9:
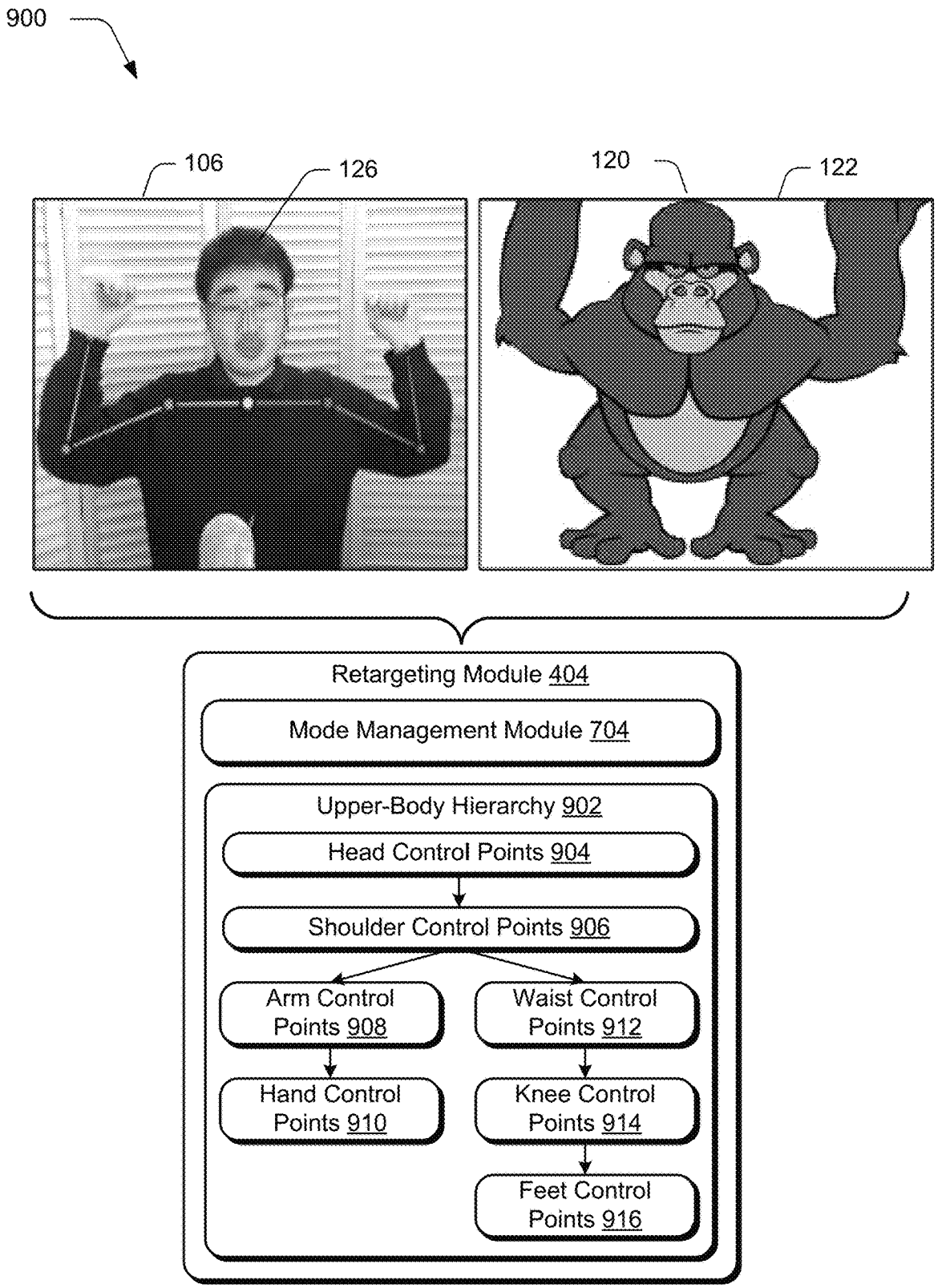
FIGS. 9 and 10 depict an example of operation of a mode management module of the retargeting module in greater detail.
Figure 10:
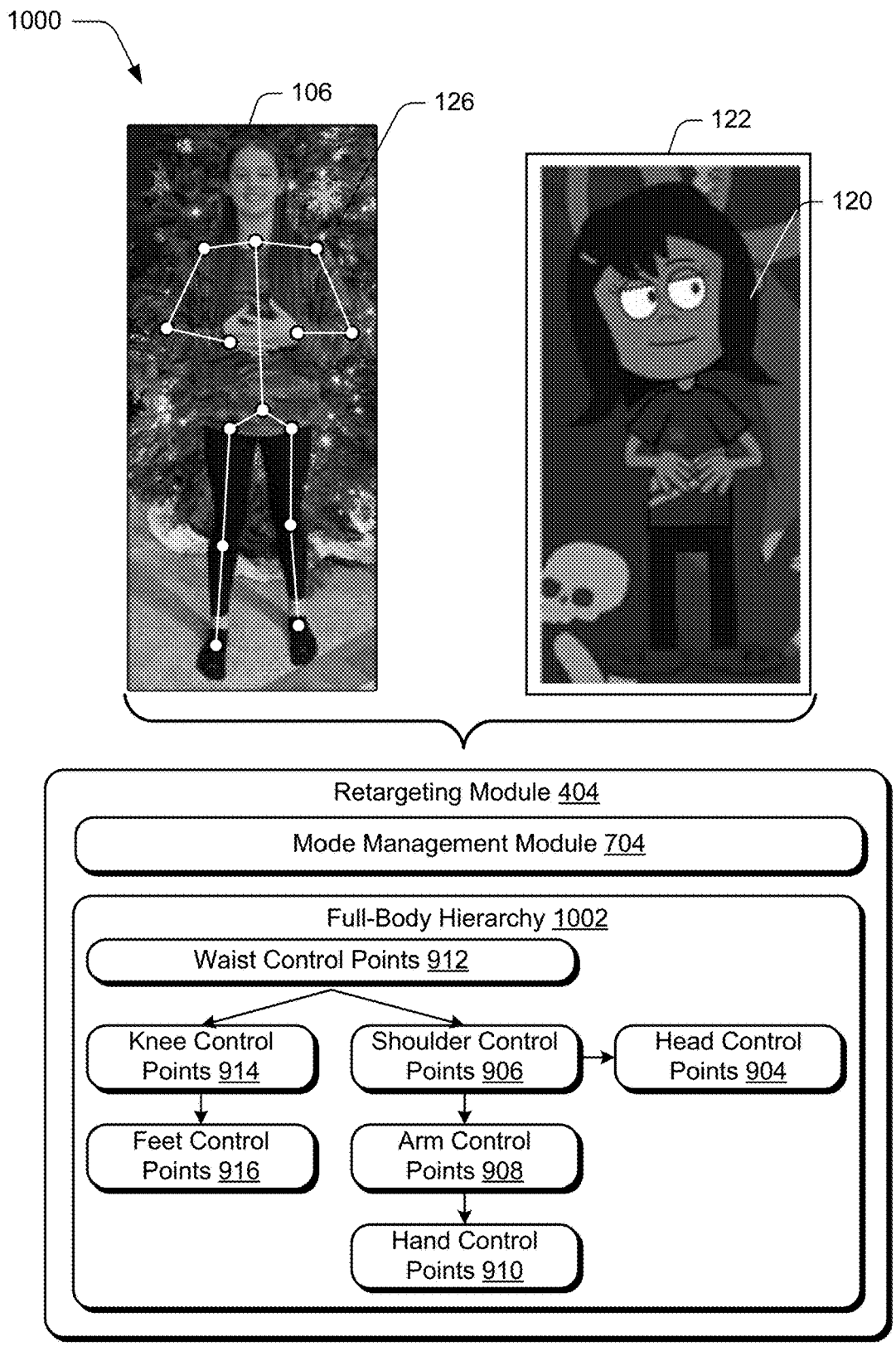

FIGS. 9 and 10 depict examples 900, 1000 showing operation of the mode management module 704 of FIG. 7 in greater detail. As described above, a subject may be positioned at different depths from the digital camera 104. As such, this introduces challenges for retargeting control points because in some instances those control points are not visible in a current digital image 106.

Accordingly, in these examples a mode management module 704 is utilized to select modes used to control an order, in which, input feature positions and corresponding control points are retargeted. This is performed by detecting whether input feature positions include a particular portion of the subject and based on this selecting a mode from a plurality of modes that define an order using a hierarchy to retarget the control points based on the corresponding feature positions.

In the example 900 of FIG. 9, for instance, the subject 126 is positioned close to the digital camera 104 such that an upper body is visible in the digital image 106. However, feature positions corresponding to a lower portion of the subject 126 are not visible. Therefore, the mode management module 704 selects an upper-body hierarchy 902 to specify an order for processing control points beginning at a head and/or shoulders of digital object 120 using corresponding feature positions from the subject 126. The example upper-body hierarchy 902 starts at head control points 904 to shoulder control points 906. The hierarchy then branches outward to arm control points 908 and hand control points 910 down one branch and waist control points 912, knee control points 914, and feet control points 916 down another branch. In this way, the retargeting module 404 "walks" the upper-body hierarchy 902 to scale factors between control points based on correspondence to portions of the subject 126.

On the other hand, in the example 1000 of FIG. 10, the particular portion of the subject 126 is visible in the digital image 106, e.g., includes input feature positions corresponding to a waist of the subject 126. In response, the mode management module 704 selects a full-body hierarchy 1002 to process control points and corresponding feature positions starting at a middle (e.g., waist) and progressing "outward." This helps to minimize float by reducing an amount of error accumulated between the waist and the feet.

The full-body hierarchy 1002, for instance, begins at the waist control points 912 and proceeds outward to a first branch that includes knee control points 914 and feet control points 916. A second branch includes shoulder control points 906 and then branches between head control points 904 and shoulder control points 908, which is followed by hand control points 910. As a result, different roots of the different hierarchies define the processing orders, which also control how error accumulates across retargeting the digital object 120. This minimizes retargeting error at a base of the digital object 120, e.g., the feet, and thus reduces float such that the digital object 120 appears grounded at a ground plane in the frame 122.

Figure 11:
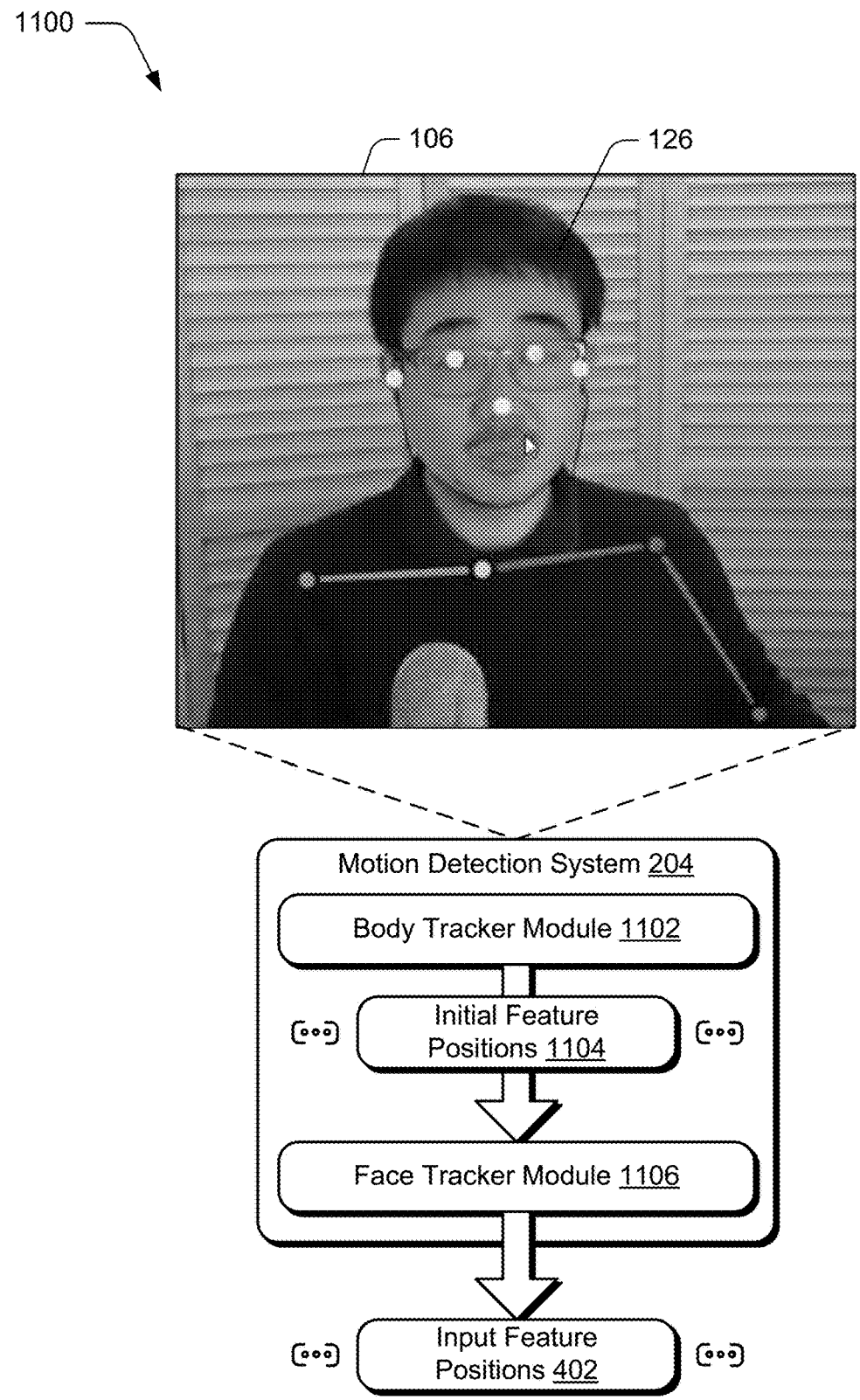
FIG. 11 depicts an example of operation of a motion detection system using initial feature positions generated by a body tracker module to initialize a face tracker module.

FIG. 11 depicts an example implementation 1100 of improved feature position detection. Accuracy in detection of feature positions in the face and shoulder portions of the subject 126 has a direct effect on accuracy of subsequent processing performed by the retargeting module 404. As described in relation to FIG. 8, for instance, distances between feature positions in the face and/or shoulders are used to generate the global scale factor 802 used to "factor out" changes in depth from the digital camera 104.

Conventional techniques that rely solely on face tracking, for instance, can fail in instances involving wrongful detection that causes the face to "come off" the body of the subject 126 due to textures or other objects included in the digital image 106, e.g., a T-shirt worn by the subject 126 that also includes an image of a face. To overcome this, the motion detection system 204 includes a body tracker module 1102 that is configured to detect initial feature positions 1104 as global feature positions of an overall body of the subject 126.

The initial feature positions 1104 are then used to initialize a face tracker module 1106 to generate the input feature positions 402, e.g., based on a position of a head of the subject 126 indicated by the initial feature positions 1104. Improvements in accuracy are especially notable in full body real world scenarios in which a relative scale of the face of the subject 126 is small. In this way, the motion detection system 204 improves accuracy in the generation of the input feature positions 402 and overcomes conventional challenges and improves operation of the computing device 102.

Figure 12:
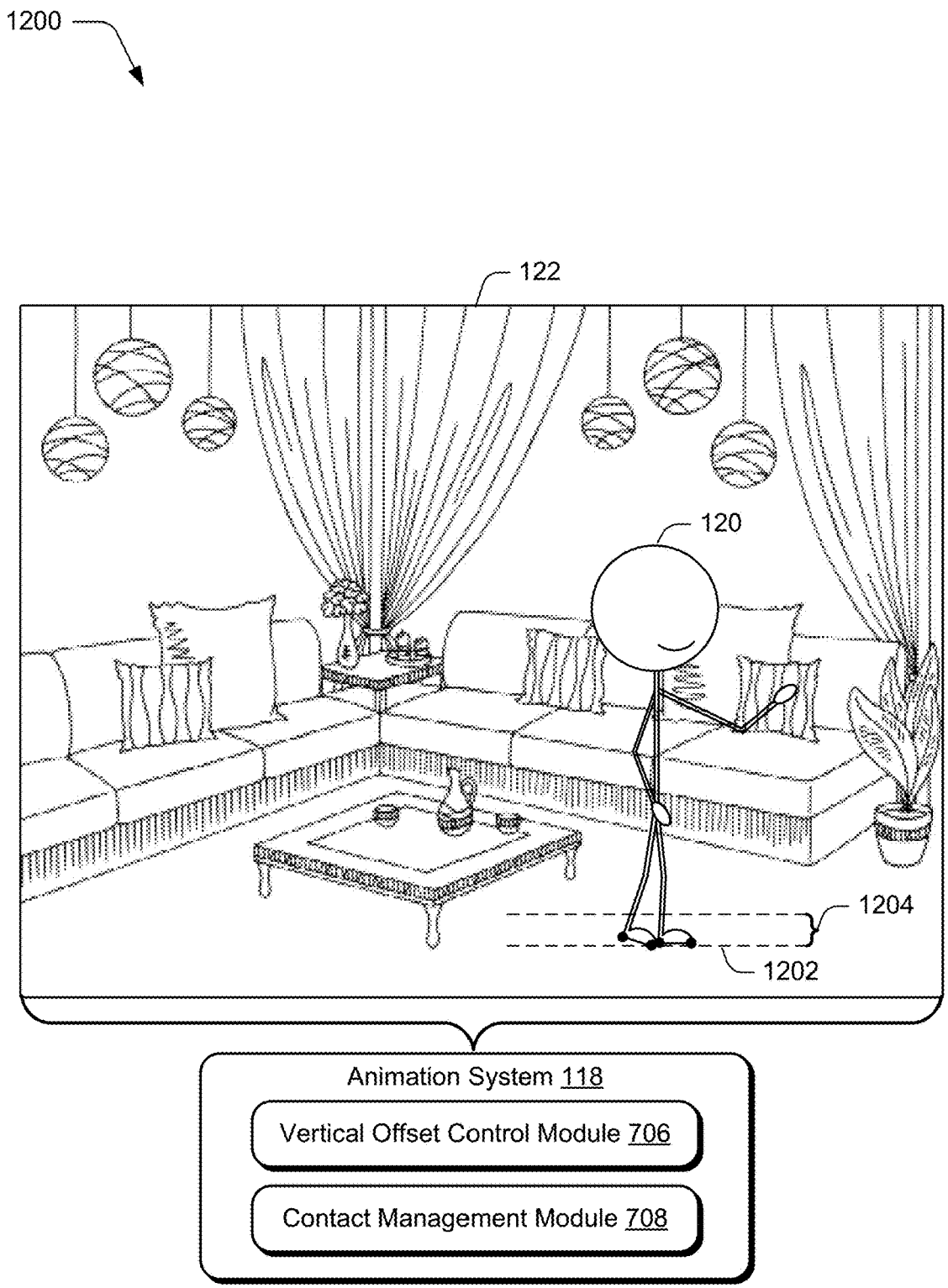
FIG. 12 depicts an example of a vertical offset control module and a contact management module of the animation system.

FIG. 12 depicts another example 1200 of techniques usable to overcome conventional challenges involving float of a digital object 120 in a frame 122 of an animation. Accurate alignment of a digital object 120 with a ground plane 1202 (e.g., surface) is one of the primary ways to support a realistic appearance of a frame 122 of an animation. However, conventional techniques to do so often fail and result in "float" of the digital object 120. This is due to a variety of factors, including use of a top/down hierarchy such that errors accumulate when configuring the digital object 120 for a single frame 122, which is further exacerbated over time across multiple frames. This is addressed in FIGS. 9 and 10 through use of different modes based on visibility of particular feature points, which improves accuracy by limiting accumulation of errors.

Additional techniques are also usable to improve alignment of a base of the digital object 120 to the ground plane 1202, functionality of which is represented as a vertical offset control module 706 and a contact management module 708. The vertical offset control module 706 is configured to set vertical offsets of control points associated with a based on the digital object 120 are taken directly from feature points associated with a base of the subject 126, e.g., the feet, as scaled by the global scale factor 802. Thus, this is performed "outside" of the previously described hierarchies for the vertical offsets. Horizontal offsets of the base, on the other hand, are retargeted through the hierarchy. Otherwise, foot retargeting is dependent on how the digital object 120 places the feet, and not with respect to tracked poses from the digital image 106.

Even with the above-described functionality, float may be encountered in instances due to errors in detection of feature positions by the motion detection system 204. To address this, the contact management module 708 is configured to incorporate a term that limits movement within a threshold 1204 vertical distance from the ground plane 1202. In this way, the threshold 1204 acts to damper movement away from the ground plane 1202. A friction term is also usable to limit horizontal movement of the base (e.g., the feet) of the digital object 120, and thus reduces errors viewable as horizontal jitters.

In another instance, initial positions of the base of the digital object 120 are used by the contact management module 708 to define the ground plane 1202. The contact management module 708 then sets a base of the digital object 120 to be positioned above the ground plane 1202, and thus limits unnatural movement of the digital object 120 below the ground plane 1202. In this way, the animation 118 improves accuracy over conventional techniques in the generation of the digital object 120 for the frame 122 of the animation 118.

FIGS. 13A-13G depict examples of translation-based retargeting through use of a hierarchy and positional offsets. In a first example 1300 of FIG. 13A, a face scale 1302 is determined in a subject 126 in a digital image 106 that is used to set a body scale in relation to the digital object 1304. In the second example 1310 of FIG. 13B, a scale factor is set for a segment 1312 between a neck and shoulder of the subject 126 in the digital image 106 and a corresponding segment 1314 between a neck and shoulder of the digital object 120. This process continues "down" the hierarchy in a third example 1320 of FIG. 13C in which a scale factor is set for a segment 1322 between a shoulder and elbow of the subject 126 in the digital image 106 and a corresponding segment 1324 between a shoulder and elbow of the digital object 120. In the fourth example 1330 of FIG. 13D, a scale factor is set for a segment 1332 between an elbow and wrist of the subject 126 in the digital image 106 and a corresponding segment 1334 between an elbow and wrist of the digital object 120.

Figure 13A:
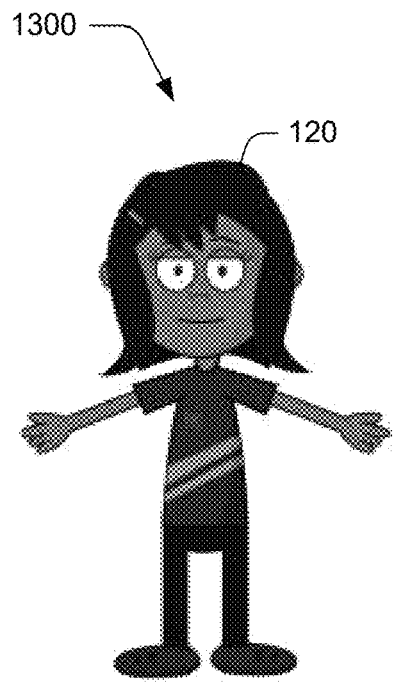
FIGS. 13A-13G depict an example of use of a hierarchy and positional offsets as part of translation-based retargeting.
Figure 13A:
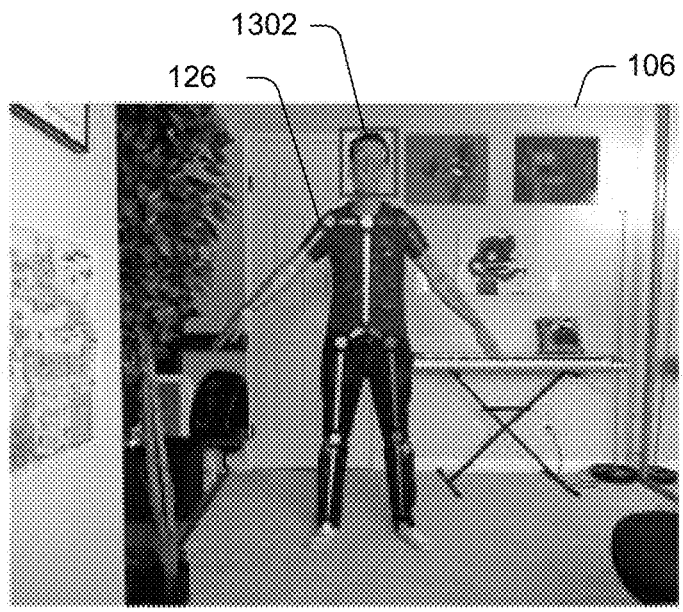
Figure 13B:
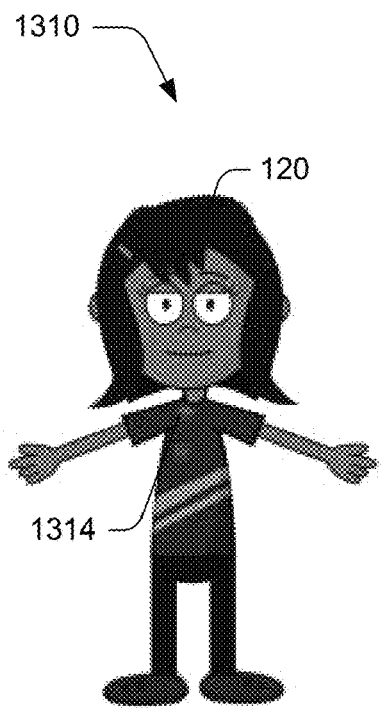
Figure 13B:
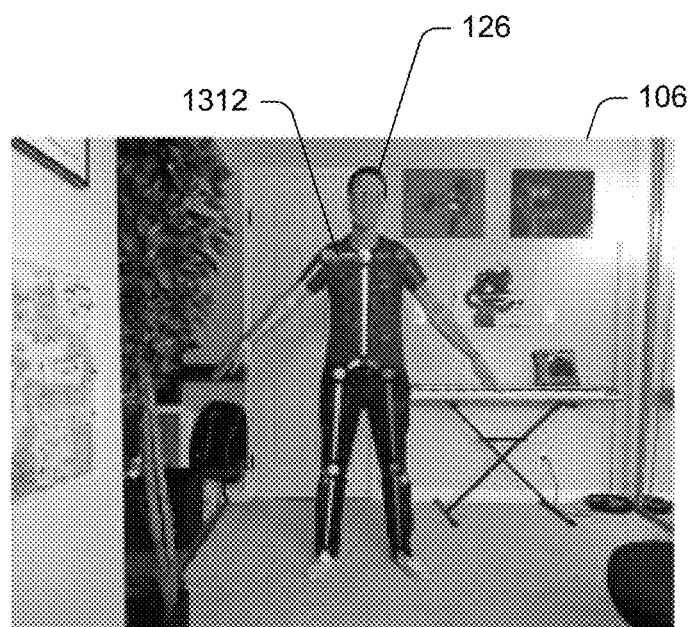
Figure 13C:
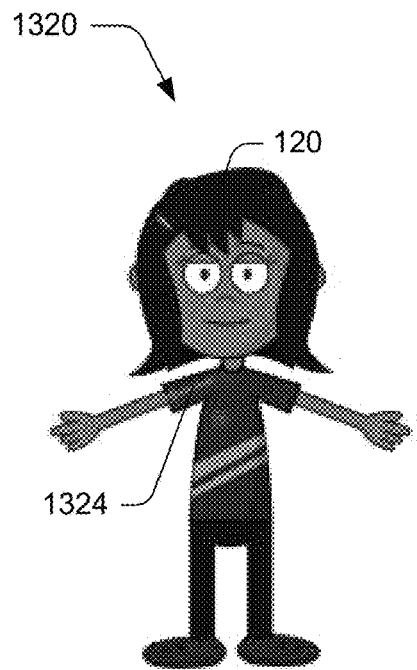
Figure 13C:
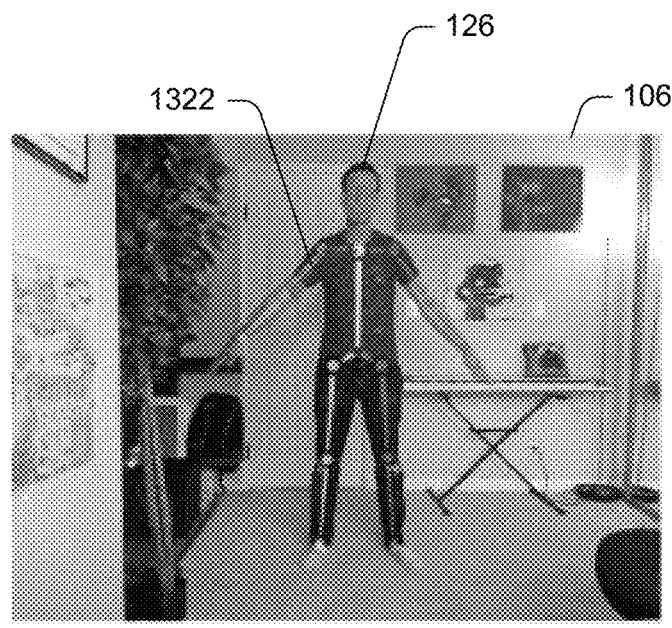
Figure 13D:
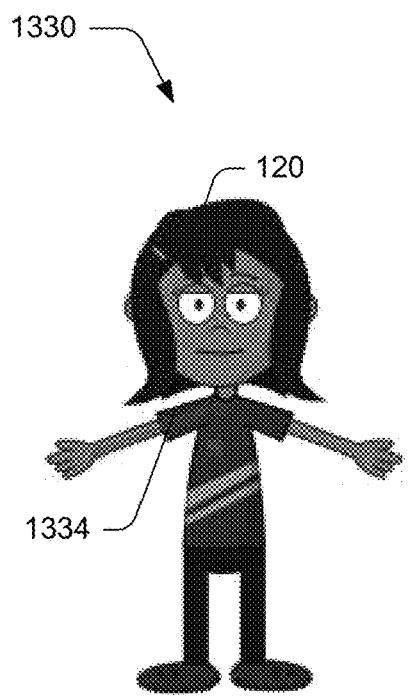
Figure 13D:
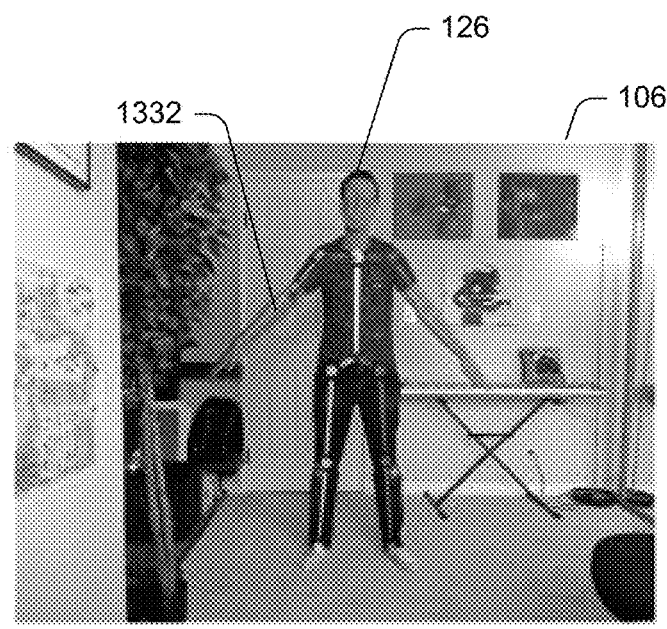
Figure 13E:
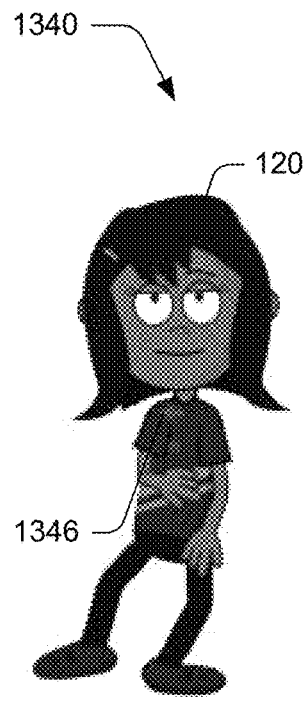
Figure 13E:
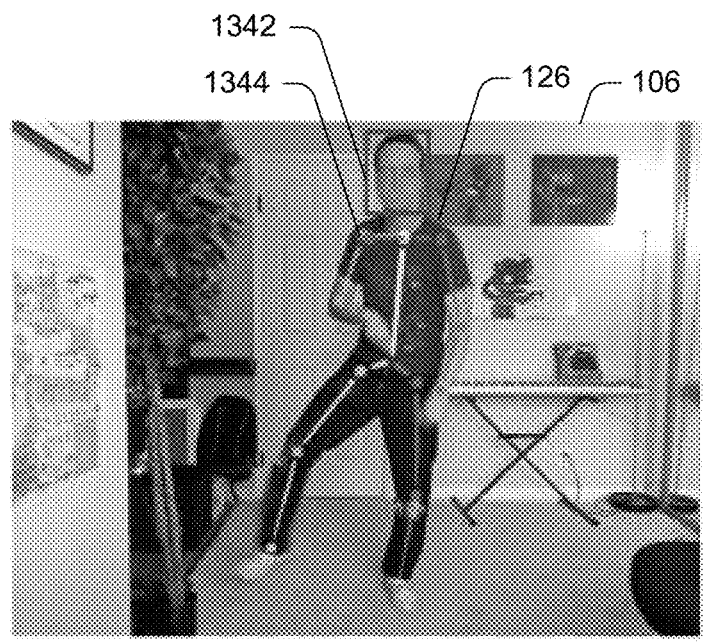
Figure 13F:
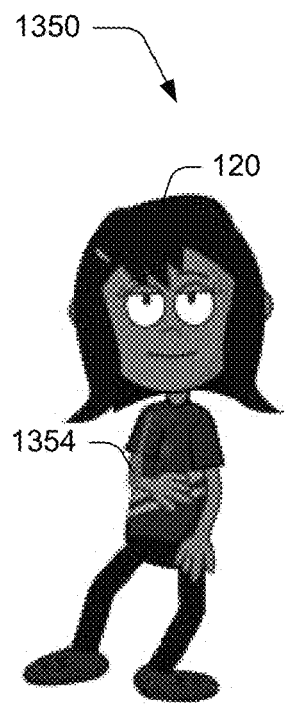
Figure 13F:
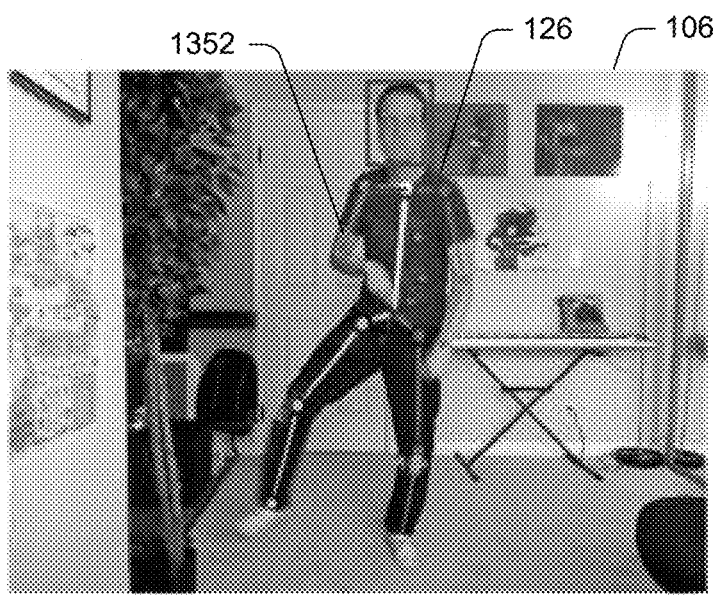
Figure 13G:
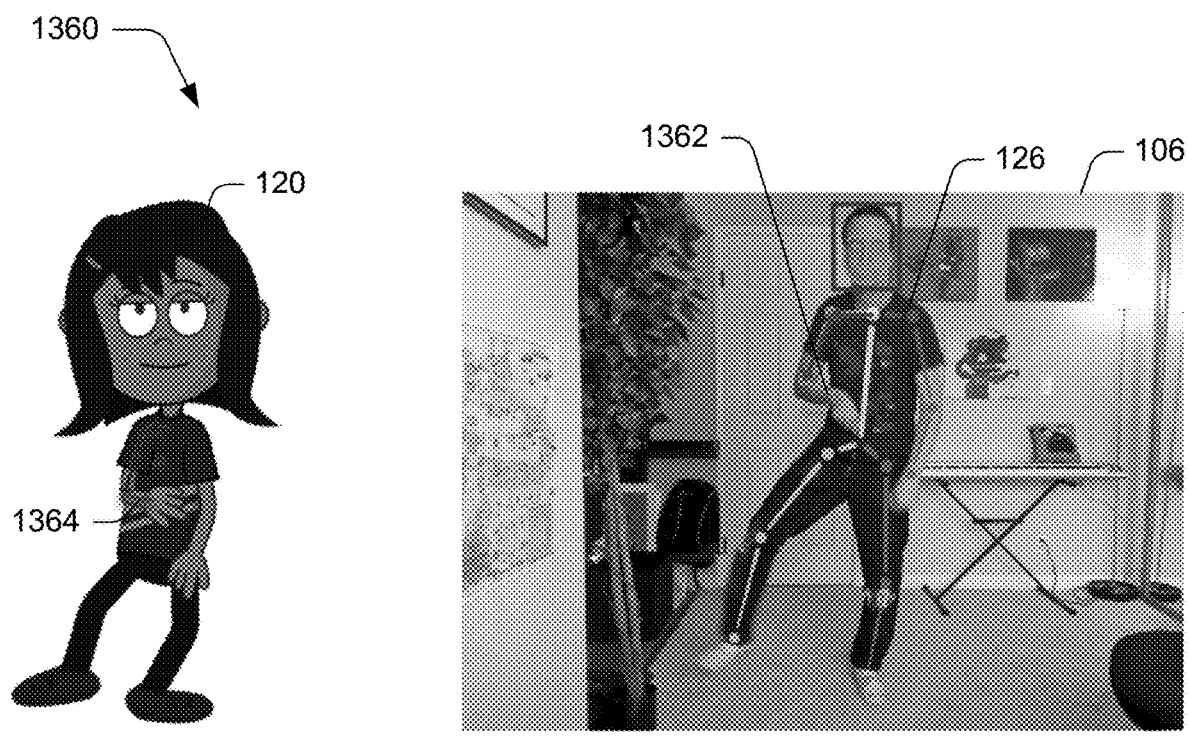

In the fifth example 1340 of FIG. 13E, a face scale 1342 is determined and applied to a segment 1344 between a neck and shoulder of the subject 126 in the digital image 106 to factor out distance in order to scale a corresponding segment 1346 of the digital object 120. In the sixth example 1350 of FIG. 13F, this process continues to factor out body scale which is applied to a segment 1352 between a shoulder and elbow of the subject in the digital image 106 and a segment 1354 of the digital object 120 and in the seventh example 1360 of FIG. 13G to factor out body scale in a segment 1362 between an elbow and wrist of the subject 126 in the digital image 106 and a corresponding segment 1364 in the digital object 120.

Example System and Device

Figure 14:
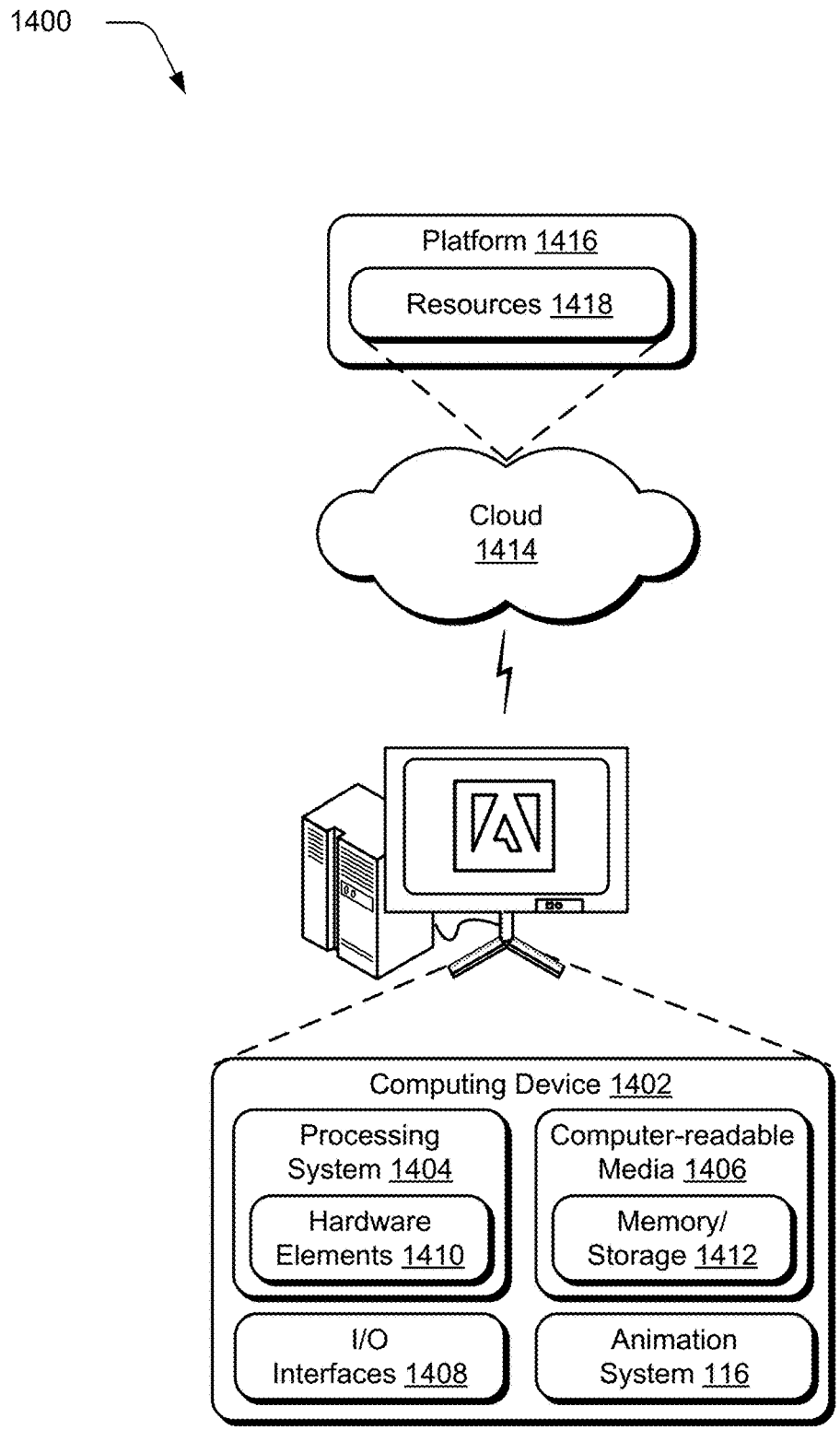
FIG. 14 illustrates an example system including various components of an example device that can be implemented as any type of computing device as described and/or utilize with reference to FIGS. 1-13F to implement embodiments of the techniques described herein.

FIG. 14 illustrates an example system generally at 1400 that includes an example computing device 1402 that is representative of one or more computing systems and/or devices that implement the various techniques described herein. This is illustrated through inclusion of the animation system 116. The computing device 1402 is configurable, for example, as a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O interface 1408 that are communicatively coupled, one to another. Although not shown, the computing device 1402 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that is configurable as processors, functional blocks, and so forth. This includes implementation in hardware as an application specific integrated circuit or other logic device formed using one or more semiconductors. The hardware elements 1410 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1406 is illustrated as including memory/storage 1412. The memory/storage 1412 represents memory/storage capacity associated with one or more computer-readable media. The memory/storage 1412 includes volatile media (such as random access memory (RAM)) and/or nonvolatile media (such as read only memory (ROM), Flash memory, optical disks, magnetic disks, and so forth). The memory/storage 1412 includes fixed media (e.g., RAM, ROM, a fixed hard drive, and so on) as well as removable media (e.g., Flash memory, a removable hard drive, an optical disc, and so forth). The computer-readable media 1406 is configurable in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1402. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1402, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1410. The computing device 1402 is configured to implement particular instructions and/or functions corresponding to the software and/or hardware modules. Accordingly, implementation of a module that is executable by the computing device 1402 as software is achieved at least partially in hardware, e.g., through use of computer-readable storage media and/or hardware elements 1410 of the processing system 1404. The instructions and/or functions are executable/operable by one or more articles of manufacture (for example, one or more computing devices 1402 and/or processing systems 1404) to implement techniques, modules, and examples described herein.

The techniques described herein are supported by various configurations of the computing device 1402 and are not limited to the specific examples of the techniques described herein. This functionality is also implementable all or in part through use of a distributed system, such as over a "cloud" 1414 via a platform 1416 as described below.

The cloud 1414 includes and/or is representative of a platform 1416 for resources 1418. The platform 1416 abstracts underlying functionality of hardware (e.g., servers) and software resources of the cloud 1414. The resources 1418 include applications and/or data that can be utilized while computer processing is executed on servers that are remote from the computing device 1402. Resources 1418 can also include services provided over the Internet and/or through a subscriber network, such as a cellular or Wi-Fi network.

The platform 1416 abstracts resources and functions to connect the computing device 1402 with other computing devices. The platform 1416 also serves to abstract scaling of resources to provide a corresponding level of scale to encountered demand for the resources 1418 that are implemented via the platform 1416. Accordingly, in an interconnected device embodiment, implementation of functionality described herein is distributable throughout the system 1400. For example, the functionality is implementable in part on the computing device 1402 as well as via the platform 1416 that abstracts the functionality of the cloud 1414.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   receiving, by the computing device, calibration data defining positional offsets between calibration feature positions of a subject and control points of a digital object to be animated;
   receiving, by the computing device, input feature positions detected from the subject as captured in a digital image of a physical environment;
   retargeting, by the computing device, the control points of the digital object by scaling the positional offsets based on the input feature positions, the retargeting including normalizing the input feature positions by computing a global scale factor based on at least two said input feature positions;
   generating, by the computing device, a frame of an animation that includes the digital object generated using the retargeted control points; and
   displaying, by the computing device, the frame of the animation in a user interface in which the digital object appears at a same depth regardless of movement of the subject along a z-axis in relation to a digital camera that captured the digital image.

2. The method as described in claim 1, wherein the control points are warp handles of the digital object.

3. The method as described in claim 1, wherein the at least two said input feature positions are part of a face or shoulders of the subject.

4. The method as described in claim 1, further comprising:
   detecting initial feature positions using a body tracker module; and
   initializing a face tracker module using the detected initial feature positions from the body tracker module to detect a face of the subject.

5. The method as described in claim 1, wherein the retargeting sets vertical offsets of the input feature positions corresponding to a base of the subject.

6. The method as described in claim 1, wherein the retargeting sets horizontal positions of the input feature positions corresponding to a base of the subject to stay above a level defined by feature positions corresponding to the base of the subject.

7. The method as described in claim 1, wherein the retargeting employs a friction term limiting movement of the input feature positions corresponding to a base of the subject.

8. A method implemented by a computing device, the method comprising:
   receiving, by the computing device, calibration data defining positional offsets between calibration feature positions of a subject and control points of a digital object to be animated;
   receiving, by the computing device, input feature positions detected from the subject as captured in a digital image of a physical environment;
   retargeting, by the computing device, the control points of the digital object by:
      detecting whether the input feature positions include a particular portion of the subject;
      selecting a mode from a plurality of modes based on a result of the detecting, the plurality of modes used to set respective orders for processing the control points based on correspondence to portions of the subject; and
      scaling the positional offsets based on the input feature positions;
   generating, by the computing device, a frame of an animation that includes the digital object generated using the retargeted control points; and
   displaying, by the computing device, the frame of the animation in a user interface.

9. The method as described in claim 8, wherein the particular portion is a lower portion of the subject and the plurality of modes include:
   a full-body mode that is selectable responsive to detecting that the input feature positions include the lower portion of the subject; and
   an upper-body mode that is selectable responsive to detecting that the input feature positions does not include the lower portion of the subject.

10. The method as described in claim 9, wherein:
    the full-body mode sets a root of a hierarchy defining the order for the processing, sequentially, starting at the control points corresponding to a waist of the subject; and
    the upper-body mode sets the root of a hierarchy defining the order for the processing the portions of the subject, sequentially, at the control points corresponding to a head or shoulders of the subject.

11. The method as described in claim 8, wherein the control points are warp handles of the digital object.

12. The method as described in claim 8, wherein the retargeting sets vertical offsets of the input feature positions corresponding to a base of the subject.

13. The method as described in claim 8, wherein the retargeting sets horizontal positions of the input feature positions corresponding to a base of the subject to stay above a level defined by feature positions corresponding to the base of the subject.

14. The method as described in claim 8, wherein the retargeting employs a friction term limiting movement of the input feature positions corresponding to a base of the subject.

15. A system comprising:
    a processing system; and
    a computer-readable storage medium having instructions stored thereon that, responsive to execution by the processing system, causes the processing system to perform operations including:
       receiving input feature positions detected from a subject captured in a digital image of a physical environment;
       detecting whether the input feature positions include a particular portion of the subject;
       selecting a mode from a plurality of modes based on a result of the detecting, the plurality of modes used to set respective orders for processing the input feature positions based on correspondence to respective portions of the subject;
       retargeting control points of a digital object based on the input feature positions using the respective order of the selected mode; and
       generating a frame of an animation that includes the digital object generated using the retargeted control points.

16. The system as described in claim 15, wherein the control points are warp handles of the digital object.

17. The system as described in claim 15, wherein the particular portion is a lower portion of the subject and the plurality of modes include:
    a full-body mode that is selectable responsive to detecting that the input feature positions include the lower portion of the subject; and
    an upper-body mode that is selectable responsive to detect that the input feature positions does not include the lower portion of the subject.

18. The system as described in claim 17, wherein:
    the full-body mode sets a root of a hierarchy defining the order for the processing the input feature positions and the control points starting at a waist of the subject; and
    the upper-body mode sets the root of a hierarchy defining the order for the processing the input feature positions and the control points starting at a head or shoulders of the subject.

19. The system as described in claim 15, wherein the retargeting includes normalizing the input feature positions by computing a global scale factor based on at least two said input feature positions.

20. The system as described in claim 19, wherein the operations further comprise:
    detecting initial feature positions using a body tracker module; and
    initializing a face tracker module using the detected initial feature positions from the body tracker module to detect the input feature positions of a face of the subject.

* * * * *